US010038882B2

(12) United States Patent
Fukuyama et al.

(10) Patent No.: US 10,038,882 B2
(45) Date of Patent: Jul. 31, 2018

(54) PROJECTOR AND METHOD OF CONTROLLING PROJECTOR

(71) Applicant: SEIKO EPSON CORPORATION, Tokyo (JP)

(72) Inventors: Takanori Fukuyama, Matsumoto (JP); Hiroshi Nara, Matsumoto (JP); Kazunori Maeta, Matsumoto (JP); Kaname Nagatani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/120,638

(22) PCT Filed: Feb. 27, 2015

(86) PCT No.: PCT/JP2015/001032
§ 371 (c)(1),
(2) Date: Aug. 22, 2016

(87) PCT Pub. No.: WO2015/133104
PCT Pub. Date: Sep. 11, 2015

(65) Prior Publication Data
US 2017/0019649 A1    Jan. 19, 2017

(30) Foreign Application Priority Data
Mar. 3, 2014   (JP) ................................. 2014-040476

(51) Int. Cl.
*H04N 9/31* (2006.01)
*G03B 21/14* (2006.01)
*G03B 21/20* (2006.01)

(52) U.S. Cl.
CPC ......... *H04N 9/3194* (2013.01); *G03B 21/145* (2013.01); *G03B 21/20* (2013.01);
(Continued)

(58) Field of Classification Search
CPC ...... G03B 21/14; G03B 21/20; G03B 21/145; G03B 21/2026; G03B 21/2046;
(Continued)

(56) References Cited

U.S. PATENT DOCUMENTS 7,329,011 B2 *  2/2008  Kobayashi ............ F21V 7/0016
                                                          313/114
7,824,039 B2    11/2010  Takito et al.
(Continued)

FOREIGN PATENT DOCUMENTS

EP          2551719 A1     1/2013
JP       2003-186109 A     7/2003
(Continued)

OTHER PUBLICATIONS

May 26, 2015 International Search Report issued in International Patent Application No. PCT/JP2015/001032.

Primary Examiner — Sultan Chowdhury
(74) Attorney, Agent, or Firm — Oliff PLC

(57) ABSTRACT

A projector and a method of controlling the projector that may give information on suitability of a light source. A projector includes light sources, light modulators (liquid crystal panels) that modulate lights output from the light sources, a projection optical device that projects the lights modulated by the light modulators, a determination unit that determines whether or not a light source unadapted to a mounting position of the projector is attached, and an informing unit (display control unit) that, if a determination that the light source unadapted to the mounting position of the projector is attached is made by the determination unit, gives information in response to a determination result.

8 Claims, 6 Drawing Sheets

(52) U.S. Cl.
CPC ..... *G03B 21/2053* (2013.01); *G03B 21/2066* (2013.01); *H04N 9/3144* (2013.01); *H04N 9/3164* (2013.01)

(58) Field of Classification Search
CPC .. H04N 9/3105; H04N 9/3141; H04N 9/3173; F21V 15/00; F21V 15/01; G02B 27/62
See application file for complete search history.

(56) References Cited

U.S. PATENT DOCUMENTS

| | | |
|---|---|---|
| 7,967,447 B2 | 6/2011 | Lin et al. |
| 8,523,365 B2 | 9/2013 | Nagarekawa et al. |
| 2004/0080715 A1* | 4/2004 | Miyashita ............ H04N 9/3141 353/30 |
| 2008/0111976 A1 | 5/2008 | Takito et al. |
| 2012/0019790 A1 | 1/2012 | Nagarekawa et al. |
| 2013/0029605 A1 | 1/2013 | Patil |
| 2013/0258291 A1* | 10/2013 | Kotani ............... G03B 21/2013 353/30 |
| 2014/0098351 A1* | 4/2014 | Read ................. G03B 21/2013 353/38 |

FOREIGN PATENT DOCUMENTS

| | | | |
|---|---|---|---|
| JP | 2005-062590 | A | 3/2005 |
| JP | 2006-276446 | A | 10/2006 |
| JP | 2008-122887 | A | 5/2008 |
| JP | 2009-151064 | * | 7/2009 |
| JP | 2009-151064 | A | 7/2009 |
| JP | 2011-017826 | A | 1/2011 |
| JP | 2012-027171 | A | 2/2012 |

\* cited by examiner

PROJECTOR AND METHOD OF CONTROLLING PROJECTOR

TECHNICAL FIELD

The present invention relates to a projector and a method of controlling the projector.

BACKGROUND ART

In related art, a projector including a light source and a projection optical device that modulates light output from the light source, forms an image in response to image information, and enlarges and projects the image on a projection surface of a screen or the like is known.

Incidentally, as the light source employed for the projector, a configuration including an arc tube such as a high-pressure mercury lamp is known. The arc tube has a light emitting part having a nearly spherical shape, and a pair of sealed parts extending from both ends of the light emitting part in directions away from each other. When the arc tube is turned on, the temperature of the upper end portion of the light emitting part in the vertical direction becomes higher and the temperature of the lower end portion becomes lower than that of the upper end portion. Further, when the high-temperature state of the upper end portion of the light emitting part continues, denitrification is likely to occur, and, on the other hand, when the temperature difference between the upper end portion and the lower end portion is larger, blackening is likely to occur and the arc tube is easily deteriorated.

For the problem, a projector including a light source adapted to guide cooling air to the upper end portion even when the projector is mounted in either position of a normal position (stationary position) with the bottom part of the projector directed downward or an inverted position (hanging position) vertically inverted with respect to the normal position is proposed (for example, see PTL 1).

CITATION LIST

Patent Literature

PTL 1: JP-A-2012-27171

SUMMARY OF INVENTION

Technical Problem

Incidentally, the projectors maybe used in other mounting positions such as a vertical position with the bottom surface part directed to the side than the normal position or the inverted position. Further, when the mounting position of the projector changes, the position corresponding to the upper end portion of the light emitting part in the vertical direction changes in response to the mounting position. For example, when the projector is rotated from the normal position and the inverted position to about 90 degrees into the vertical position, the location corresponding to the upper end portion also changes to about 90 degrees in response to the rotation of the projector. Accordingly, in the projector disclosed in PTL 1, there is a risk that it is impossible to efficiently guide cooling air to the upper end portion of the light emitting part in the vertical position or appropriately cool the arc tube.

On this account, for example, it is conceivable that a light source suitable for the mounting position such as a light source suitable for the case where the mounting position of the projector is the vertical position is employed. However, when the projector is used, it is impossible to determine what kind of light source is attached inside, and thereby, there is a risk that, though the light source suitable for the mounting position of the projector is not attached, the light source is continued to light and a problem that the life of the arc tube becomes shorter occurs.

One of the objects of the invention is to provide a projector and a method of controlling the projector that may give information on suitability of a light source.

Solution to Problem

A projector according to a first aspect of the invention is a projector characterized by including a light source, a light modulator that modulates light output from the light source, a projection optical device that projects the light modulated by the light modulator, a determination unit that determines whether or not a light source unadapted to amounting position of the projector is attached, and an informing unit that, if a determination that the light source unadapted to the mounting position of the projector is attached is made by the determination unit, gives information in response to a determination result.

Note that the light source unadapted to the mounting position of the projector includes e.g., alight source in which cooling efficiency and lighting efficiency are lower than the original efficiency when attached to a projector mounted in the mounting position.

Further, giving information in response to the determination result includes e.g., display of characters and signs, output of predetermined sound, lighting of an indicator, or the like in response to the determination result.

According to the first aspect described above, the determination unit determines whether or not the light source unadapted to the mounting position is attached, and if the determination that the light source is attached is made, the informing unit gives information in response to the determination result.

According to the configuration, the user may be informed of attachment of the light source unsuitable for the current mounting position of the projector. Accordingly, continuous use of the projector despite the attachment of the light source unsuitable for the current mounting position may be suppressed. Therefore, reduction of the life and the light emission brightness of the light source may be suppressed.

In the first aspect described above, it is preferable that the projector includes a position detection unit that detects the mounting position and the determination unit performs determination based on a detection result by the position detection unit.

According to the first aspect described above, the determination unit performs the determination processing based on the mounting position of the projector detected by the position detection unit. Thereby, whether or not the light source unsuitable for the current mounting position of the projector is attached may be determined without complex operation of e.g., manual input of the mounting position by the user or the like. Therefore, the operation of the projector may be simplified.

In the first aspect described above, it is preferable that the position detection unit has a gravity sensor.

According to the first aspect described above, the position detection unit has the gravity sensor and the mounting position of the projector may be appropriately detected based on the detected vertical direction, and thereby, the suitability determination of the light source may be performed.

In the first aspect described above, it is preferable that a lighting control unit that, if the determination that the light source unadapted to the mounting position is attached is made by the determination unit, performs one of brightness reduction of the light source determined to be unadapted to the mounting position and turning off of power of the light source is provided.

According to the first aspect described above, one of brightness reduction and turning off of power of the light source determined to be unadapted to the mounting position may be performed by the lighting control unit. Thereby, the temperature of the light source may be made lower, and thus, lighting of the light source unsuitable for the mounting position and reduction of the life of the light source may be suppressed more reliably.

In the first aspect described above, it is preferable that the mounting position includes a first position in which a bottom surface part of the projector is directed upward or downward and a second position having the same projection direction as the first position, in which the bottom surface part of the projector is directed toward a side.

Note that, for example, the same projection direction refers to a state in which images are projected on a projected surface in the same location in the respective first position and second position.

According to the first aspect described above, the determination unit determines whether or not the light source unadapted to the mounting position of the projector including the first position (the normal position or the inverted position) and the second position (the vertical position) is attached.

According to the first aspect described above, in the case where the light source suitable for the second position is attached to the projector mounted in the first position or the case where the light source suitable for the first position is attached to the projector mounted in the second position to which the position of the projector has been rotated to 90 degrees from the first position, information in response to the determination result may be given. Therefore, information of the attachment of the light source unsuitable for the current mounting position of the projector may be given.

In the first aspect described above, it is preferable that the light source includes an arc tube having a light emitting part that discharges and emits light and a sealed part extending from the light emitting part, and a reflector that is attached to the sealed part, and reflects light entering from the light emitting part in a direction opposite to the extension direction of the sealed part from the light emitting part to output the light to outside of the light source, in which, of the first position and the second position, one mounting position is a position in which an output direction of the light from the light source is along a horizontal direction, and the other mounting position is a position in which the output direction of the light from the light source is along a vertical direction.

Note that the output direction of the light along the horizontal direction includes the output direction in the horizontal direction and the output direction nearly in the horizontal direction slightly tilted with respect to the horizontal direction, but seen to be substantially aligned with the horizontal direction. This also applies to the output direction of the light along the vertical direction.

Here, the location of the upper end portion in the vertical direction at the highest temperature differs in the light emitting part between the case in the direction of the light output from the light source along the horizontal direction and the case in the direction of the light output from the light source along the vertical direction, and thus, it is necessary to change the blowing direction and the amount of air for cooling the upper end portion. Accordingly, if the light source used for the projector in the mounting position in the output direction along the vertical direction is attached to the projector mounted in the mounting position in the output direction of the light output from the light source along the horizontal direction, it may be impossible to appropriately cool the light emitting part, i.e., the arc tube. This also applies to the case where the light source used for the projector in the mounting position in the output direction along the horizontal direction is attached to the projector mounted in the mounting position in the output direction of the light output from the light source along the vertical direction.

On the other hand, in the first aspect with this configuration described above, if the light source unadapted to the mounting position of the projector is attached, information is given by the informing unit, and thereby, the user may be reliably informed of the condition that may cause the deterioration of the arc tube. Therefore, continuous lighting of the light source unsuitable for the mounting position and reduction of the life of the light source may be suppressed even more reliably.

A method of controlling a projector according to a second aspect of the invention is a method of controlling a projector that modulates and projects luminous flux output from a light source, and is characterized by including determining whether or not a light source unadapted to a mounting position of the projector is attached, and if a determination that the light source unadapted to the mounting position is attached is made, giving information in response to a determination result.

The control method according to the second aspect described above is applied to a projector, and thereby, the same advantages as those of the projector according to the first aspect may be obtained.

DESCRIPTION OF EMBODIMENTS

As below, one embodiment of the invention will be explained with reference to the drawings.

[Schematic Configuration of Projector]

Figure 1:
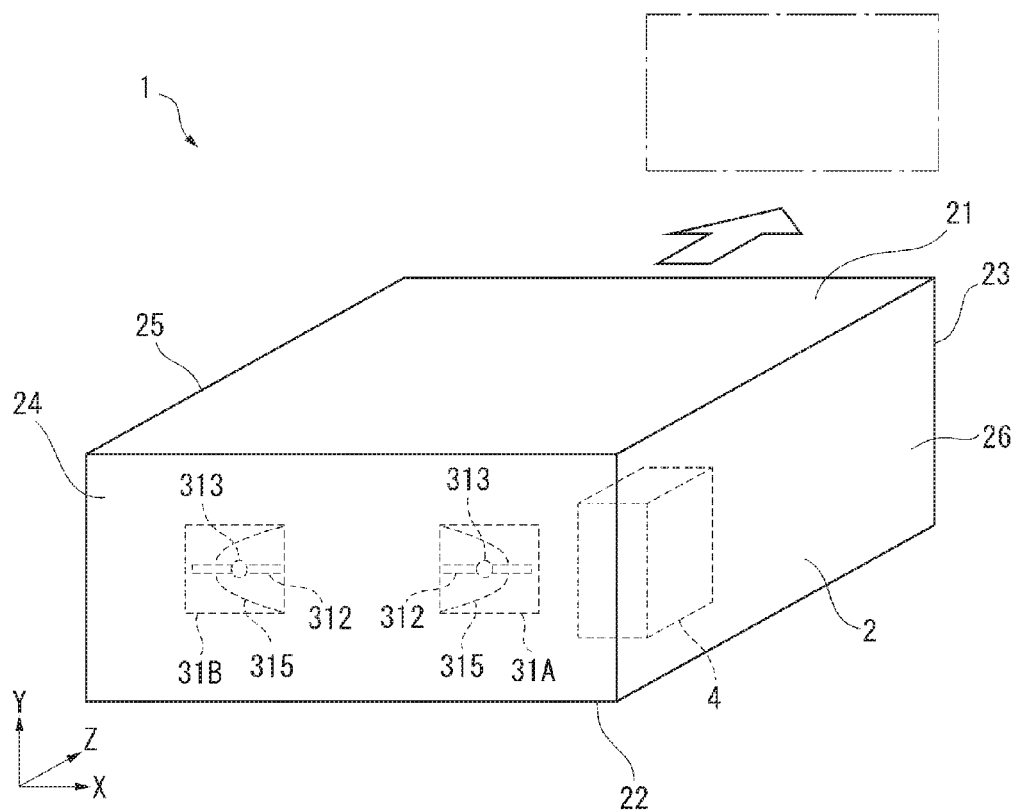
FIG. 1 is a schematic diagram showing an outer appearance configuration of a projector according to one embodiment of the invention.

FIG. 1 is a schematic diagram showing an outer appearance configuration of a projector 1 according to the embodiment.

The projector 1 projects an image in response to image information on a projected surface such as a screen (not shown) to display the image. As shown in FIG. 1, the projector 1 includes an exterior casing 2 forming an exterior.

[Configuration of Exterior Casing]

The exterior casing 2 is a casing made of metal or synthetic resin including a top surface part 21 and a bottom surface part 22 opposed to each other, a front surface part 23, a rear surface part 24, a right side surface part 25, and a left side surface part 26.

Of them, the bottom surface part 22 is a surface facing a mounting surface of a mounting stand or the like when the projector 1 is mounted on the mounting surface, and leg parts (not shown) in contact with the mounting surface are provided on the bottom surface part 22. The position in which the projector 1 is mounted so that the bottom surface part 22 may face the mounting surface is referred to as "normal position". Further, the position in which the projector 1 is mounted so that the bottom surface part 22 may face the ceiling surface is referred to as " inverted position". Note that the projected images in these normal position and inverted position are landscape images as shown by a dashed-dotted rectangle.

The front surface part 23 and the rear surface part 24 are located at the front side and the rear side in the exterior casing 2 in the normal position. Of them, a projection optical device 35 forming an optical unit 3 and projecting images is exposed via an opening part in the front surface part 23.

The right side surface part 25 and the left side surface part 26 are located at the right side and the left side in the exterior casing 2 in the normal position.

Note that, in the following explanation, a projection direction of images by the optical unit 3 (projection optical device 35) is the Z-direction, and the directions respectively orthogonal to the Z-direction and orthogonal to each other are the X-direction and the Y-direction. In the embodiment, the Y-direct ion is the direction directed upward when the projector is mounted in the normal position (the direction from the bottom surface part 22 toward the top surface part 21), and the X-direction is the direction from right to left when the projector in the normal position is seen from the front side (the direction from the right side surface part 25 to the left side surface part 26).

[Configuration of Optical Unit]

Figure 2:
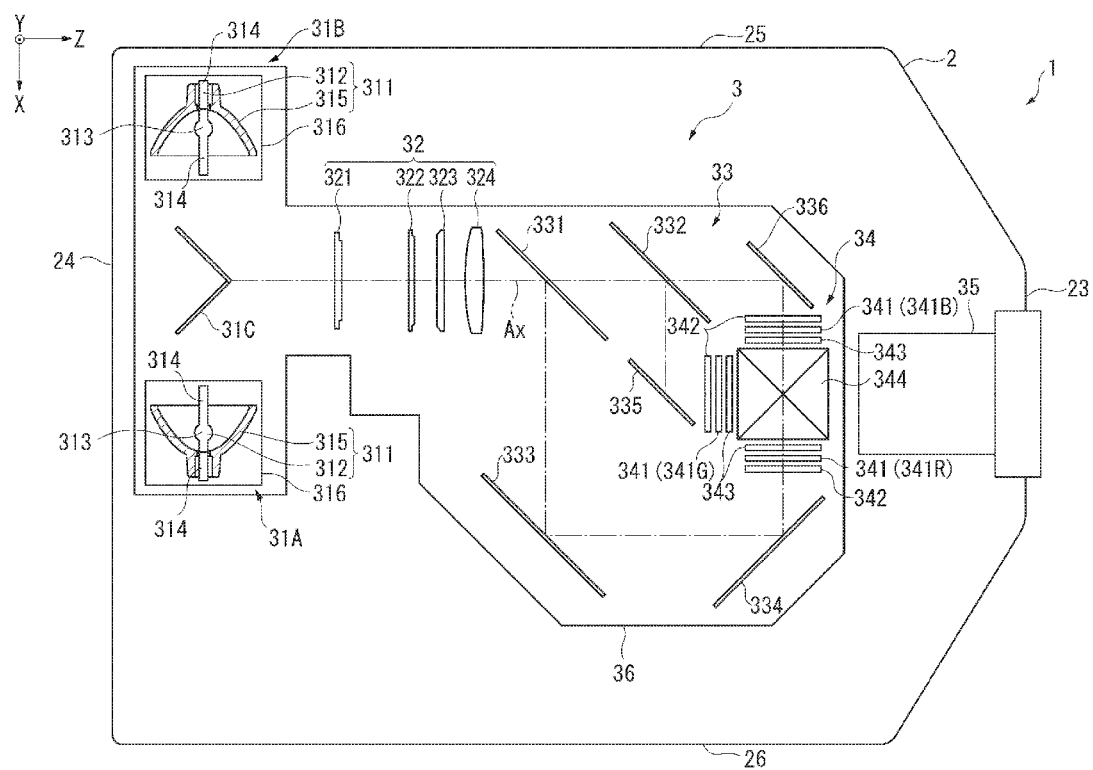
FIG. 2 is a schematic diagram showing an internal configuration of the projector in the embodiment.

FIG. 2 is a schematic diagram showing an internal configuration of the projector 1.

The projector 1 includes the optical unit 3 housed inside of the exterior casing 2 in addition to the exterior casing 2.

The optical unit 3 forms and projects images in response to image information under control by a controller 5, which will be described later.

As shown in FIG. 2, the optical unit 3 includes a pair of light sources 31A, 31B, a reflection mirror 31C, an illumination optical device 32, a color separation optical device 33, an electrooptical device 34, the projection optical device 35, and a casing for optical components 36.

Of them, the casing for optical components 36 is a casing that houses the light sources 31A, 31B, the reflection mirror 31C, and the respective optical devices 32 to 34 inside.

The pair of light sources 31A, 31B are oppositely provided with the reflection mirror 31C interposed therebetween to respectively output luminous fluxes toward the reflection mirror 31C. Further, the reflection mirror 31C reflects the respective lights entering from the light sources 31A, 31B in the same direction, and thereby, allows the lights to enter the illumination optical device 32.

The illumination optical device 32 has lens arrays 321, 322, a polarization conversion element 323, and a superimposing lens 324.

The color separation optical device 33 has dichroic mirrors 331, 332, and reflection mirrors 333 to 336.

The electrooptical device 34 has three liquid crystal panels 341 as light modulators (a liquid crystal panel at the red light side is 341R, a liquid crystal panel at the green light side is 341G, and a liquid crystal panel at the blue light side is 341B), three light incident-side polarizers 342, three light exiting-side polarizers 343, and a cross dichroic prism 344 as a color combining optical device.

Further, in the optical unit 3, according to the above described configuration, the luminous fluxes output from the pair of light sources 31A, 31B are reflected by the reflection mirror 31C along an illumination optical axis Ax (FIG. 2) set inside of the casing for optical components 36, and applied to the illumination optical device 32. The luminous fluxes applied to the illumination optical device 32 are uniformized in in-plane illuminance in the illumination optical device 32 and separated into three color lights of R, G, B in the color separation optical device 33. The separated respective color lights are respectively modulated in response to the image information in the respective liquid crystal panels 341, and images of the respective color lights are formed. The images of the respective color lights are combined in the cross dichroic prism 344, and projected on a screen (not shown) in the projection optical device 35.

[Configuration of Light Sources]

As shown in FIG. 2, the pair of light sources 31A, 31B each includes a light source lamp 311 having an arc tube 312 and a reflector 315 corresponding to a reflector according to the invention, and a housing 316 that houses the light source lamp 311 inside.

Of them, the arc tube 312 has a light emitting part 313 that bulges in a nearly spherical shape and encloses a light emitting material of mercury or the like inside, and a pair of sealed parts 314 extending from both ends of the light emitting part in directions away from each other. Further, the light source lamp 311 is formed with the reflector 315 attached to the one sealed part 314 and is provided inside of the housing 316. The light from the light emitting part 313 is reflected by the reflector 315 in an opposite direction to the extension direction of the sealed part 314 with the reflector 315 attached thereto (the direction from the sealed part 314 toward the light emitting part 313). That is, in the respective light sources 31A, 31B, the output directions of the lights are directions along the center axes of the arc tubes 312.

The light sources 31A, 31B are replaceably attached within the exterior casing 2.

Figure 3:
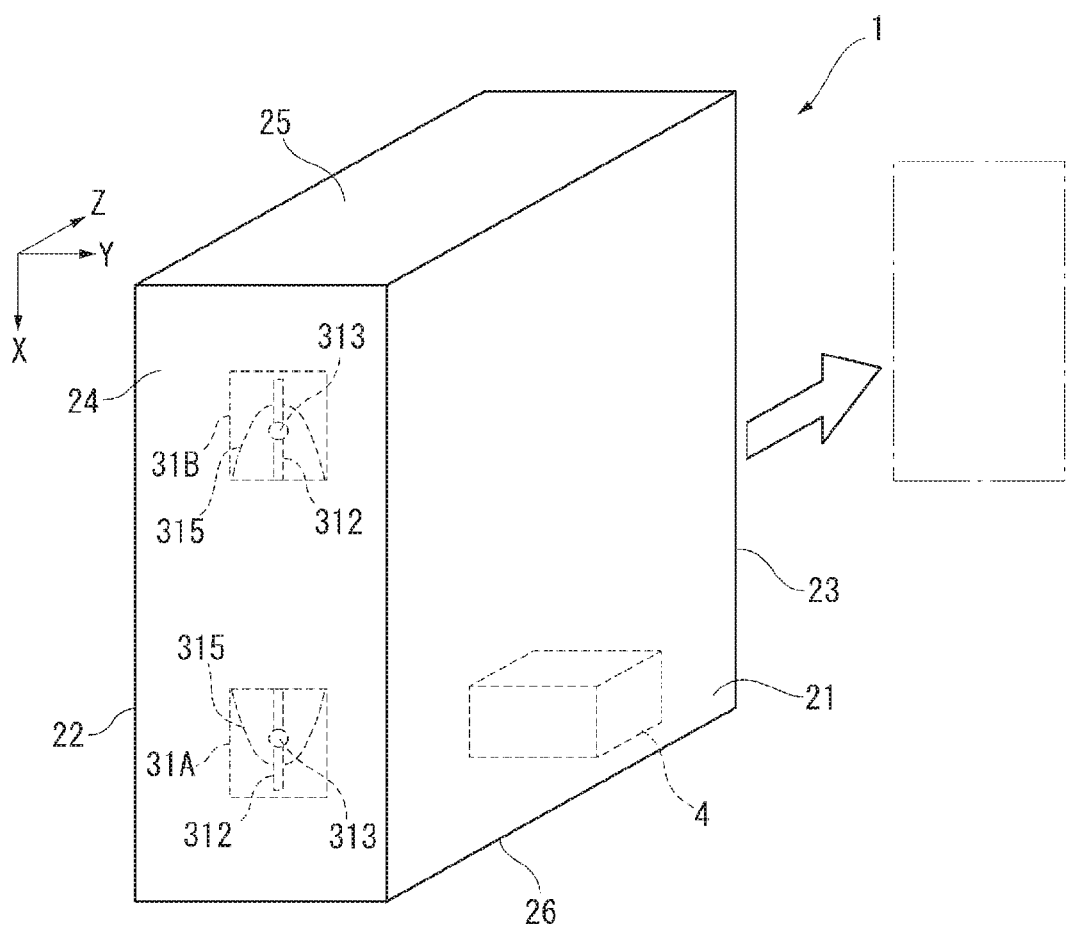
FIG. 3 is a schematic diagram showing the projector in a vertical position in the embodiment.

FIG. 3 schematically shows the projector 1 mounted in a vertical position corresponding to the so-called portrait mode projection.

Here, a relationship between the mounting position of the projector 1 and the directions along the center axes of the arc tubes 312, i.e., the output directions of the lights is explained.

When the projector 1 is mounted in the normal position, as shown in FIG. 1, the center axes of the respective arc tubes 312 of the light sources 31A, 31B are along the horizontal directions.

On the other hand, as shown in FIG. 3, when the projector 1 is mounted in the vertical position in which the bottom surface part 22 is directed toward the side and the right side surface part 25 is directed upward, the center axes of the respective arc tubes 312 of the light sources 31A, 31B are along the vertical directions.

Further, as described above, when the arc tube 312 is turned on, the temperature of the upper end portion in the vertical direction in the light emitting part 313 is the highest, and, if the arc tube 312 is not appropriately cooled, denitrification and blackening are likely to occur and the deterioration of the arc tube 312 is promoted, and the life of the arc tube 312 becomes shorter. The location of the upper end portion changes depending on the position of the projector 1. For example, in the normal position and the inverted position, the center axis of the arc tube 312 is along the horizontal direction and the location of the upper end portion is in the upper part nearly at the center in the direction along the center axis in the light emitting part 313. However, in the vertical position, the center axis of the arc tube is along the vertical direction, and the location of the upper end portion deflects toward the one sealed part 314. Accordingly, it is necessary to change the blowing direction and the amount of air for cooling the arc tube 312 in response to the mounting position of the projector 1.

On the other hand, in the embodiment, the light sources 31A, 31B in which the housings 316 are adapted so that appropriate amounts of cooling air may be blown to the arc tubes 312 in the appropriate blowing directions in response to the mounting position of the projector 1, i.e., the mounting position of the arc tubes 312 are attached to the projector 1, and thereby, deterioration of the arc tubes 312 is suppressed.

[Configuration of Position Detection Unit]

Figure 4:
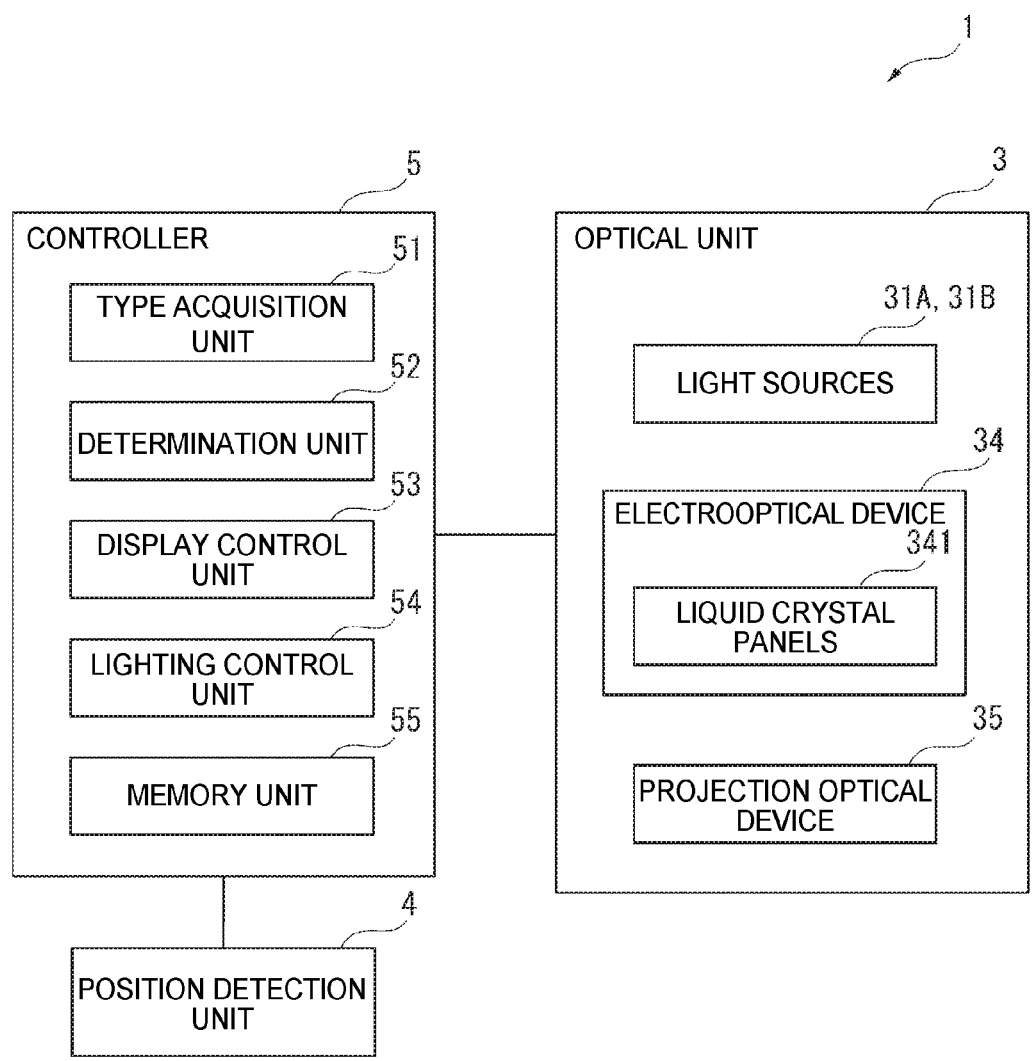
FIG. 4 is a block diagram showing the internal configuration of the projector in the embodiment.

FIG. 4 is a block diagram showing the internal configuration of the projector 1 including a position detection unit 4 and the controller 5.

As shown in FIG. 4, the projector 1 further includes the position detection unit 4 and the controller 5.

The position detection unit 4 has a gravity sensor, and detects the mounting position of the projector 1 based on a detection result of the gravity sensor. Specifically, the position detection unit 4 is adapted to detect the normal position, the inverted position, and the vertical position as the mounting positions of the projector 1 based on the detection result.

[Configuration of Controller]

The controller 5 includes hardware of a CPU (Central Processing Unit), a RAM (Random Access Memory), a flash memory, etc. and controls operation of the projector 1. For example, the controller 5 controls the optical unit 3 to form and project images in response to image information.

Further, the controller 5 determines whether or not the light sources 31A, 31B having specifications not suitable for the mounting position of the projector 1 are attached, and controls the optical unit 3 to inform the user of information in response to a determination result. Accordingly, as shown in FIG. 4, the controller 5 has a memory unit 55 including the RAM and the flash memory and further has a type acquisition unit 51, a determination unit 52, a display control unit 53, and a lighting control unit 54 as functional units.

The type acquisition unit 51 acquires types of the light sources 31A, 31B from the light sources 31A, 31B attached to the projector 1. For example, the type acquisition unit 51 acquires identification information representing whether the light sources 31A, 31B are light sources for the normal position and the inverted position or light sources for the vertical position from memory parts (not shown) provided in the attached light sources 31A, 31B. Note that, not limited to the configuration, but a configuration may be employed in which switches are provided in the attachment locations of the light sources 31A, 31B and the type acquisition unit 51 acquires identification information representing whether the light sources are light sources for the normal position and the inverted position or light sources for the vertical position according to whether or not the switches are pressed down.

The determination unit 52 grasps the mounting position of the projector 1 based on the detection result by the position detection unit 4. Further, the determination unit 52 determines whether or not the light sources 31A, 31B unadapted to the mounting position are attached.

For example, if the mounting position of the projector 1 is the normal position and the respective light sources 31A, 31B are light sources for the normal position, a determination that there is no light source unadapted to the mounting position is made. On the other hand, if the mounting position of the projector 1 is the normal position and at least one of the respective light sources 31A, 31B is not the light source for the normal position, a determination that a light source unadapted to the mounting position is attached is made. This applies to the case where the mounting position of the projector 1 is the vertical position.

The display control unit 53 drives the liquid crystal panels 341 in response to image information to form and display images in response to the image information. In addition, the display control unit 53 allows the projector 1 to display an error informing image if the determination that a light source unadapted to the mounting position of the projector 1 is attached is made by the determination unit 52. The error informing image contains information representing that the light source unadapted to the mounting position of the projector 1 is attached and information representing which light source is unadapted. Further, the error informing image maybe displayed by e.g., OSD (On Screen Display). The display control unit 53 corresponds to an informing unit according to the invention.

The lighting control unit 54 controls the lighting conditions (turning on and off and light emission brightness when turned on etc.) of the light sources 31A, 31B. Further, if a determination that the light source unadapted to the current mounting position of the projector 1 is attached is made by the determination unit 52, the lighting control unit 54 reduces the lighting brightness of the light source to be lower than that in the case where the light source adapted to the mounting position is attached or turns off the light source.

The memory unit 55 stores various programs and data necessary for controlling the projector 1. For example, the memory unit 55 stores a control program for execution of error detection processing (see FIG. 5), which will be described later, and the CPU executes the control program, and thereby, the type acquisition unit 51, the determination unit 52, the display control unit 53, and the lighting control unit 54 are realized.

[Error Detection Control of Light Sources by Controller]

Figure 5:
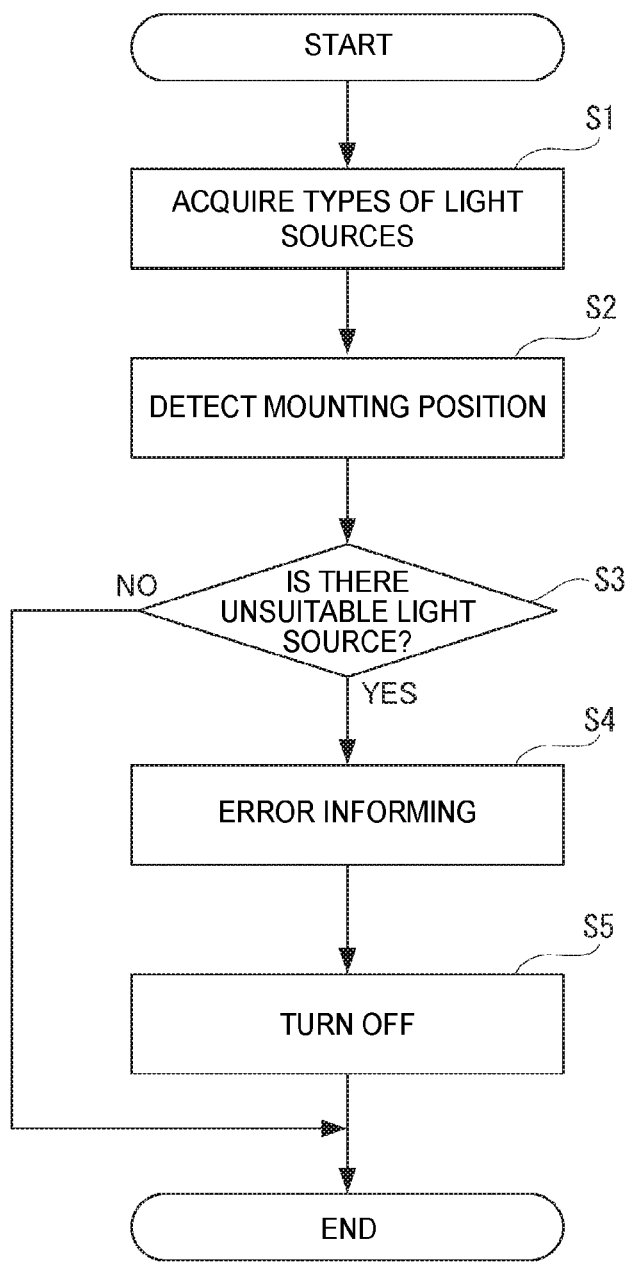
FIG. 5 is a flowchart showing error detection processing in the embodiment.

FIG. 5 is a flowchart showing an example of the error detection processing.

In the projector 1 described above, the CPU of the controller 5 executes an error detection program stored in the memory unit 55, and thereby, performs the following error detection processing. The processing is executed at the time when the power of the projector 1 is turned on (activated) or the like in the embodiment, however, may be performed at a predetermined time such as a time in response to user's operation.

As shown in FIG. 5, in the error detection processing, the type acquisition unit 51 acquires the types of the light sources 31A, 31B (step S1). That is, the type acquisition unit 51 acquires identification information representing whether the light sources 31A, 31B are the light sources for normal position and inverted position or the light sources for vertical position.

Then, the position detection unit 4 detects the mounting position of the projector 1, and the determination unit 52 grasps the mounting position of the projector 1 based on the detection result by the position detection unit 4 (step S2).

Then, the determination unit 52 determines whether or not the light sources having specifications unsuitable for the mounting position of the projector 1 are attached (step S3). That is, the determination unit 52 determines whether or not the light sources 31A, 31B unadapted to the current mounting position are attached based on the types of the light sources 31A, 31B and the mounting position of the projector 1.

If a determination that the light sources having the specifications unsuitable for the mounting position of the projector 1 are attached is made by the determination unit 52 (step S3: YES), the display control unit 53 allows the projector 1 to display an error informing image in a predetermined period based on the determination result (step S4).

If the predetermined period has lapsed after the error informing image is displayed, then, the lighting control unit 54 and the light sources 31A, 31B are turned off (step S5). In this manner, the error detection processing by the controller 5 is ended. In this case, as a result of the error detection processing, an error has been detected and the light sources 31A, 31B have been turned off, and thereby, the projector 1 maintains the standby state or the power is turned off.

On the other hand, at step S3, if a determination that the light sources having the specifications unsuitable for the mounting position of the projector 1 are not attached is made by the determination unit 52 (step S3: NO), the error detection processing by the controller 5 is ended. Then, in the projector 1, normal processing by the controller 5 (e.g., image display processing by the display control unit 53 etc.) is performed.

[Advantages of Embodiment]

According to the projector 1 of the above described embodiment, the following advantages are obtained.

The determination unit 52 determines whether or not the light sources unadapted to the mounting position are attached, and, if the attachment of the light sources is determined, the display control unit 53 displays an error informing image as information in response to the determination result, and informs the user of detection of the error.

According to the configuration, the user may be informed of the attachment of the light sources unsuitable for the current mounting position of the projector 1. Accordingly, continuous use of the projector 1 despite the attachment of the light sources unsuitable for the current mounting position may be suppressed. Therefore, reduction of the life and the light emission brightness of the light sources 31A, 31B may be suppressed.

Further, the determination unit 52 executes the determination processing based on the mounting position of the projector detected by the position detection unit 4. According to the configuration, whether or not the light sources unsuitable for the current mounting position of the projector 1 are attached may be determined without complex operation of e.g., manual input of the mounting position by the user or the like. Therefore, the operation of the projector 1 may be simplified.

Furthermore, the position detection unit 4 has the gravity sensor and may appropriately detect the mounting position of the projector 1 based on the detected vertical direction, and thereby, the suitability determination of the light sources may be performed. Therefore, the directions of the center axes of the arc tubes 312 (the output directions of lights) with respect to the vertical direction maybe appropriately detected, and whether or not the attached light sources 31A, 31B are light sources suitable for the current mounting position may be determined more accurately. That is, in the light sources 31A, 31B, the temperatures of the upper end portions of the light emitting parts 313 in the vertical direction are the highest. Therefore, whether or not the light sources 31A, 31B are light sources having structures for blowing air in the blowing directions and amounts that can appropriately cool the upper end portions with respect to the current mounting position and are suitable for the current mounting position may be determined more accurately based on the detected vertical direction.

Moreover, the determination that the light sources 31A, 31B are unadapted to the mounting position of the projector 1 is made, the lighting control unit 54 turns off the power of the light sources 31A, 31B. Thereby, lighting of the light sources unsuitable for the mounting position and reduction of the life of the light sources may be suppressed more reliably.

Further, the determination unit 52 determines whether or not the light sources unadapted to the mounting positions of the projector 1 including the normal position, the inverted position, and the vertical position are attached.

In the case where the light sources suitable for the vertical position are attached to the projector 1 mounted in the normal position or the inverted position or the case where the light sources suitable for the normal position or the inverted position are attached to the projector 1 mounted in the vertical position to which the position of the projector 1 has been rotated to 90 degrees from the normal position or the inverted position, information in response to the determination result may be given. Therefore, information of the attachment of the light sources unsuitable for the current mounting position of the projector 1 may be given.

Furthermore, the light sources 31A, 31B include the arc tubes 312 having the light emitting parts 313 that discharge and emit lights and the sealed parts 314 extending from the light emitting parts 313, and the normal position (inverted position) is the position in which the center axes of the arc tubes 312 (the output directions of lights) are along the horizontal directions and the vertical position is the position in which the center axes of the arc tubes 312 are along the vertical directions.

Here, the locations of the upper end portions in the vertical direction at the highest temperatures differ in the light emitting parts 313 between the case with the center axes of the arc tubes 312 along the horizontal directions and the case with the center axes of the arc tubes 312 along the vertical directions, and thus, it is necessary to change the blowing directions and the amounts of the air for cooling the upper end portions. Accordingly, if the light sources used for the projector 1 in the mounting position with the center axes of the arc tubes 312 along the vertical directions are attached to the projector 1 mounted in the mounting position with the center axes of the arc tubes 312 along the horizontal directions, it may be impossible to appropriately cool the light emitting parts 313, i.e., the arc tubes 312. This also applies to the case where the light sources used for the projector 1 in the mounting position with the center axes of the arc tubes 312 along the horizontal directions are attached to the projector 1 mounted in the mounting position with the center axes of the arc tubes 312 along the vertical directions.

On the other hand, in the projector 1 of the embodiment, if the light sources unsuitable for the mounting position of the projector 1 are attached, display processing of an error informing image (informing processing) by the display control unit 53 is performed, and thereby, the user may be reliably informed of the condition that may cause the deterioration of the arc tubes 312. Therefore, continuous lighting of the light sources unsuitable for the mounting position and reduction of the life of the light sources may be suppressed even more reliably.

[Modifications of Embodiment]

The invention is not limited to the above described embodiment, but the respective embodiments may be appropriately combined. Modifications, improvements, etc. within a range in which the purpose of the invention may be achieved are included in the invention.

In the embodiment, the configuration including the position detection unit 4 as the projector 1 is exemplified, however, the invention is not limited to that.

Figure 6:
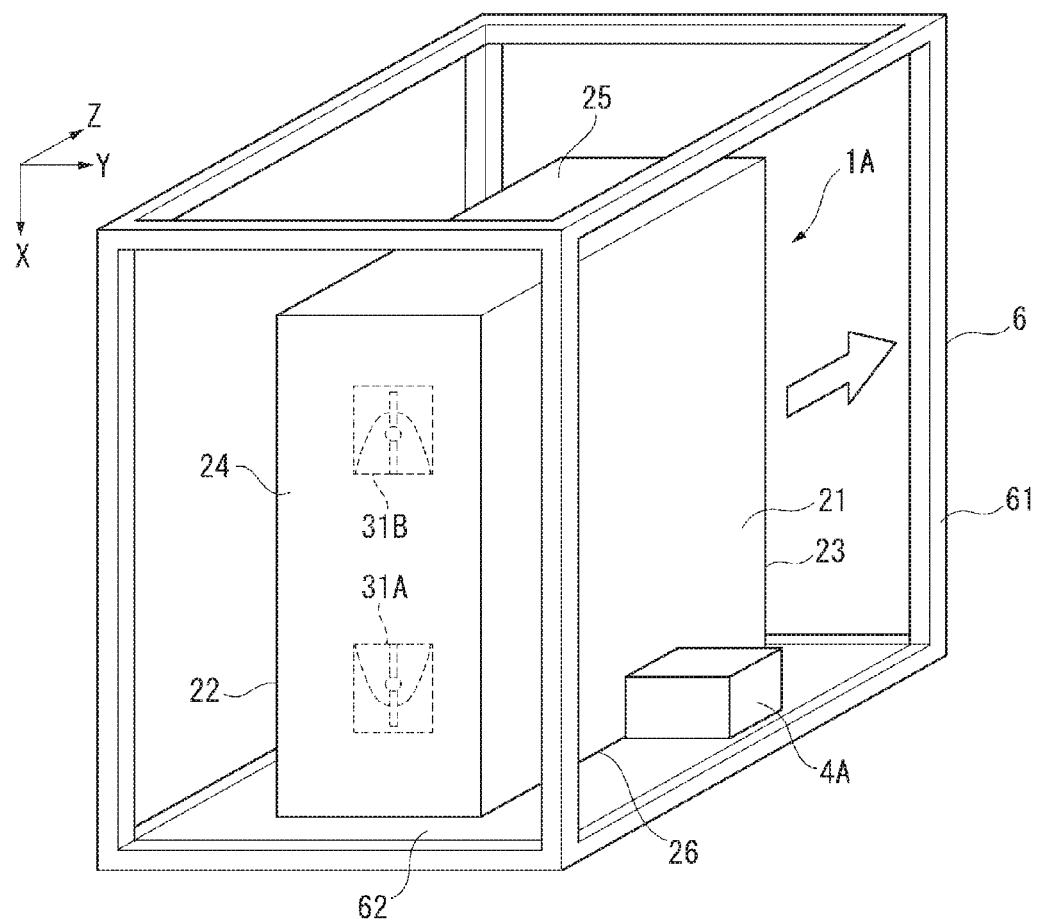
FIG. 6 is a schematic diagram showing a modified example of the embodiment.

FIG. 6 schematically shows an example of a configuration in which a position detection unit is provided outside of a projector.

As shown in FIG. 6, a projector 1A and a position detection unit 4A are integrally held by a frame 6. The frame 6 has a frame part 61 that surrounds the projector 1A and a base 62 that fixes the projector 1A and the position detection unit 4A with respect to the frame part 61. For example, the frame 6 is formed using a material having desired strength such as a metal material.

Note that the projector 1A has the same configuration as that of the projector 1 of the embodiment except the absence of the position detection unit 4.

Further, the position detection unit 4A has the same configuration as the position detection unit 4, and is connected to communicate with the projector 1A. The position detection unit 4A transmits the detected mounting position to the projector 1A.

The projector 1A and the position detection unit 4A are integrally fixed to the frame 6, and thereby, attachment of the light sources unsuitable for the mounting position of the projector 1A may be detected based on the detection result of the position detection unit 4A provided outside of the projector 1A.

Note that, in FIG. 6, the frame 6 used when the projector is used in the vertical position is shown as an example. In the case of using the frame 6, in place of the position detection unit 4A that transmits the detection result of the mounting position to the projector 1A, a frame identification unit that allows the projector 1A to detect fixation to the frame 6 for vertical position may be provided. For example, the frame identification unit outputs information representing the vertical position in place of the mounting position of the projector 1 transmitted by the position detection unit 4A to the projector 1A. According to the configuration, the projector 1A may also detect the attachment of the light sources unsuitable for the mounting position. Note that this applies to frames for other mounting positions such as the normal position and the inverted position.

Further, a configuration in which the projector 1A is rotatably held with respect to the frame 6 may be employed. For example, the base to which the projector 1A is fixed may be rotatably held with respect to the frame part.

Furthermore, as the position detection unit that detects the mounting position of the projector, a detector such as an optical sensor that detects a rotation direction and an amount of rotation of the projector with respect to the frame may be employed.

In addition, the invention is not limited to the configuration that enables detection of the mounting position by the projector such as the position detection unit or the frame identification unit. For example, a configuration in which the user may input the mounting position of the projector 1, 1A using an operation panel provided in part of the projector 1, 1A or an input device such as a remote controller (not shown) may be employed.

In the above described embodiment, the determination unit 52 acquires the mounting position of the projector 1 and the identification information of the light sources 31A, 31B and determines whether or not the light sources unsuitable for the mounting position are attached using the acquired mounting position and identification information, however, the invention is not limited to that. For example, the identification information of the light sources adapted to the current mounting position is stored in the memory unit 55, the stored identification information and the identification information of the light sources 31A, 31B are acquired, and thereby, whether or not the light sources unsuitable for the mounting position are attached may be determined.

In the above described embodiment, a configuration in which, in the error detection processing, when an error is detected, an error informing image is displayed in a predetermined period, and then, the light sources 31A, 31B are turned off is exemplified, however, the invention is not limited to that. For example, the lighting brightness of the light sources 31A, 31B may be made lower than that at the normal time. Further, only the error informing image is displayed in a predetermined period, but the light sources 31A, 31B are not turned off, and then, a normal image may be displayed. Furthermore, display of the error informing image may be continued, and the error informing image may be removed in response to the user's operation. Moreover, if a determination that one of the light sources 31A, 31B is unsuitable for the mounting position is made, the brightness of only the light source may be reduced or turned off. In this case, the other light source may be held in the same lighting condition as that at the normal time.

Further, the error informing image is not limited to an image projected by the projector 1, but, for example, the error informing image may be displayed on a display device provided in the projector 1, 1A, a remote controller, or the like (not shown).

Furthermore, in the above described embodiment, as the informing unit that gives the information result, the configuration that displays the error informing image is exemplified, however, the invention is not limited to that. For example, a status lamp that gives information of an error by lighting the lamp provided on the main body of the projector 1 may be employed, or a sound output device that gives information of the determination result by the determination unit 52 by sound may be employed.

In the above described embodiment, the configuration including the two light sources 31A, 31B is exemplified, however, the invention is not limited to that. For example, one light source may be provided or three or more light sources may be provided.

In the above described embodiment, the light sources 31A, 31B having the configurations in which the center axes of the arc tubes 312 are along the horizontal directions in the normal position (inverted position) and along the vertical directions in the vertical position are exemplified, however, the invention is not limited to those. That is, the configurations in which the respective output directions of the lights of the light sources 31A, 31B are along the horizontal directions in the normal position (inverted position) and along the vertical directions in the vertical position may be exemplified, however, the invention is not limited to those. For example, the light sources 31A, 31B may have configurations in which the center axes of the arc tubes 312 are along the vertical directions in the normal position (inverted position) and along the horizontal directions in the vertical position.

Further, the light sources 31A, 31B may have configurations in which the center axes of the arc tubes 312 are along the horizontal directions both in the normal position (inverted position) and the vertical position. In this case, like the above described embodiment, the locations of the upper end portions of the light emitting parts 313 in the vertical direction (the locations at the highest temperatures) change depending on the position of the projector 1. Therefore, in this case, it is also necessary to cool the light emitting parts 313 in response to the position, and the invention may be preferably applied to the case. Furthermore, this applies to the light sources 31A, 31B having configurations in which the center axes of the arc tubes 312 are along the vertical directions both in the normal position (inverted position) and the vertical position.

On the other hand, in the above described embodiment, the configuration in which the light sources 31A, 31B are placed to output lights in directions opposite to each other is exemplified, however, the invention is not limited to that. That is, a configuration in which the light sources 31A, 31B are placed to output lights in the same direction (e.g., Z-direction) may be employed.

In the above described embodiment, the configuration in which the two light sources 31A, 31B are light sources adapted to the same mounting position (e.g., the normal position and the inverted position) is exemplified, however, the invention is not limited to that. That is, in the case where the two or more light sources are provided, it is not necessary that all of the light sources are adapted to the same mounting position, and the light sources may be used for different mounting positions from each other.

Further, in the case where the light sources adapted to different mounting positions from each other are used, only the light source adapted to the current mounting position may be turned on. In this case, the light source unadapted to the current mounting position may be turned on with reduced brightness.

Furthermore, regarding the light source for normal position and inverted position and the light source for vertical position, the light sources having the same specifications may be placed so that the output directions of lights may be directed in response to the respective mounting positions and used as light sources in response to the respective mounting positions.

In the above described embodiment, the projector 1 includes the three liquid crystal panels 341 as the light modulators, however, the invention is not limited to that. That is, the invention may be applied to a projector including two or less or four or more liquid crystal panels as the light modulators.

In the above described embodiment, the optical unit 3 has the shape shown in FIG. 2, however, the invention is not limited to that. For example, a configuration having a nearly L-shape in the plan view and a nearly U-shape in the plan view may be employed.

In the above described embodiment, the light modulator having a transmissive liquid crystal panel with different light incident surface and light exiting surface is employed. However, the invention is not limited to that. A reflective light modulator having a reflective liquid crystal panel having the same light incident surface and light exiting surface may be employed. Further, as long as a light modulator can modulate incident luminous flux and form an image in response to image information, another light modulator than liquid crystal such as a device using a micro mirror, e.g., a DMD (Digital Micromirror Device) may be used.

The entire disclosure of Japanese Patent Application No. 2014-040476, filed Mar. 3, 2014 is expressly incorporated by reference herein.

REFERENCE SIGNS LIST

1: projector
4: position detection unit
31A, 31B: light source
341: liquid crystal panel (light modulator)
35: projection optical device
312: arc tube
313: light emitting part
314: sealed part
315: reflector (reflection mirror)
52: determination unit
53: display control unit (informing unit)
54: lighting control unit

The invention claimed is:

1. A projector comprising:
  a light source;
  a light modulator that modulates light output from the light source;
  a projection optical device that projects the light modulated by the light modulator;
  a determination unit that determines whether or not the light source is adaptable to a mounting position of the projector; and
  an informing unit that, in case that the determination unit determines that the light source is not adaptable to the mounting position, gives information in response to a determination result,
  wherein the mounting position includes a first position in which a bottom surface part of the projector is directed upward or downward and a second position having the same projection direction as the first position, in which the bottom surface part of the projector is directed toward a side.

2. The projector according to claim 1, further comprising a position detection unit that detects the mounting position,
  wherein the determination unit performs determination based on a detection result by the position detection unit.

3. The projector according to claim 2,
  wherein the position detection unit has a gravity sensor.

4. The projector according to claim 1, further comprising a lighting control unit that, if the determination that the light source unadapted to the mounting position of the projector is attached is made by the determination unit, performs one of brightness reduction of the light source determined to be unadapted to the mounting position and turning off of power of the light source.

5. The projector according to claim 1,
  wherein the light source includes:
    an arc tube having a light emitting part that discharges and emits light and a sealed part extending from the light emitting part; and
    a reflection mirror that is attached to the sealed part, and reflects light entering from the light emitting part in a direction opposite to the extension direction of the sealed part from the light emitting part to output the light to outside of the light source, and
  of the first position and the second position, one mounting position is a position in which an output direction of the light from the light source is along a horizontal direction, and the other mounting position is a position in which the output direction of the light from the light source is along a vertical direction.

6. A method of controlling a projector that modulates and projects luminous flux output from a light source, comprising:
   determining whether or not the light source is adaptable to a mounting position of the projector; and
   in case that the light source is not adaptable to the mounting position, giving information in response to a determination results,
   wherein the mounting position includes a first position in which a bottom surface part of the projector is directed upward or downward and a second position having the same projection direction as the first position, in which the bottom surface part of the projector is directed toward a side.

7. The projector according to claim 1, further comprising an input device capable of inputting the mounting position,
   wherein the determination unit performs determination based on a mounting position input by the input device.

8. The projector according to claim 7, further comprising a lighting control unit that, if the determination that the light source unadapted to the mounting position of the projector is attached is made by the determination unit, performs one of brightness reduction of the light source determined to be unadapted to the mounting position and turning off of power of the light source.

* * * * *